United States Patent
Zhang

(10) Patent No.: US 12,107,439 B2
(45) Date of Patent: Oct. 1, 2024

(54) WIRELESS CHARGING TRANSMITTING CIRCUIT, WIRELESS CHARGING RECEIVING CIRCUIT, AND METHOD

(71) Applicant: VIVO MOBILE COMMUNICATION CO., LTD., Guangdong (CN)

(72) Inventor: Wencheng Zhang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 837 days.

(21) Appl. No.: 17/132,975

(22) Filed: Dec. 23, 2020

(65) Prior Publication Data

US 2021/0119493 A1    Apr. 22, 2021

Related U.S. Application Data

(63) Continuation of application No. PCT/CN2019/094479, filed on Jul. 3, 2019.

(30) Foreign Application Priority Data

Jul. 6, 2018    (CN) .......................... 201810739006.9

(51) Int. Cl.
*H02J 50/40* (2016.01)
*G06F 1/16* (2006.01)
(Continued)

(52) U.S. Cl.
CPC ............ *H02J 50/402* (2020.01); *H02J 50/10* (2016.02); *G06F 1/1652* (2013.01); *G06F 1/189* (2013.01)

(58) Field of Classification Search
CPC ....... H02J 50/402; H02J 50/10; G06F 1/1652; G06F 1/189
(Continued)

(56) References Cited

U.S. PATENT DOCUMENTS 10,298,048 B1 *    5/2019    Juan .................... H02J 7/00034
11,146,093 B2 *   10/2021    Zeine .................... H02J 50/402
(Continued)

FOREIGN PATENT DOCUMENTS

| CN | 202978451 U | 6/2013 |
| CN | 104682579 A | 6/2015 |

(Continued)

OTHER PUBLICATIONS

International Search Report and Written Opinion dated Jan. 12, 2021 as received in application No. PCT/CN2019/094479.
(Continued)

*Primary Examiner* — Suresh Memula
(74) *Attorney, Agent, or Firm* — Brooks Kushman P.C.

(57) ABSTRACT

A wireless charging transmitting circuit and a wireless charging method are provided. The wireless charging transmitting circuit includes: a power input interface; a voltage regulator circuit, where one end is connected to the power input interface, and the other end is separately connected to a first input end of a first inverter circuit and a first input end of a second inverter circuit; a first transmit coil; a second transmit coil, connected to an output end of the second inverter circuit; and a charging control circuit, configured to: when there is a receive coil in each of a charging range of the first transmit coil and a charging range of the second transmit coil, control the first transmit coil and the second transmit coil to simultaneously perform charging, or control the first transmit coil and the second transmit coil to alternately perform charging.

12 Claims, 7 Drawing Sheets

(51) Int. Cl.
 *G06F 1/18* (2006.01)
 *H02J 50/10* (2016.01)
(58) Field of Classification Search
 USPC .......................................................... 320/108
 See application file for complete search history.

(56) References Cited

U.S. PATENT DOCUMENTS

| | | | |
|---|---|---|---|
| 11,201,500 B2 * | 12/2021 | Partovi | ............... H02J 7/00714 |
| 2011/0128153 A1 * | 6/2011 | Sims | ....................... G06F 1/325 |
| | | | 307/66 |
| 2013/0020988 A1 * | 1/2013 | Kim | ..................... H04B 5/0037 |
| | | | 320/108 |
| 2013/0307468 A1 | 11/2013 | Lee | |
| 2013/0314006 A1 * | 11/2013 | Lan | ......................... B60L 50/66 |
| | | | 320/109 |
| 2014/0159644 A1 * | 6/2014 | Kung | ....................... H02J 7/02 |
| | | | 320/107 |
| 2014/0266031 A1 | 9/2014 | Sasaki | |
| 2015/0179335 A1 | 6/2015 | Oh | |
| 2019/0058363 A1 | 2/2019 | Han | |
| 2020/0144860 A1 * | 5/2020 | Lee | ......................... H01F 38/14 |
| 2021/0119493 A1 | 4/2021 | Zhang | |

FOREIGN PATENT DOCUMENTS

| | | |
|---|---|---|
| CN | 104734271 A | 6/2015 |
| CN | 105529759 A | 4/2016 |
| CN | 106512214 A | 3/2017 |
| CN | 206195403 U | 5/2017 |
| CN | 107134857 A | 9/2017 |
| CN | 107222032 A | 9/2017 |
| CN | 107332363 A | 11/2017 |
| CN | 108923509 A | 11/2018 |
| WO | 2013155743 A1 | 10/2013 |

OTHER PUBLICATIONS

European Search Report dated Apr. 1, 2021 as received in application No. 19831390.0.
Chinese Office Action dated Oct. 16, 2020 as received in application No. 201810739006.9.
Chinese Office Action dated Jun. 23, 2020 as received in application No. 201810739006.9.
Chinese Office Action dated Jan. 2, 2020 as received in application No. 201810739006.9.

* cited by examiner

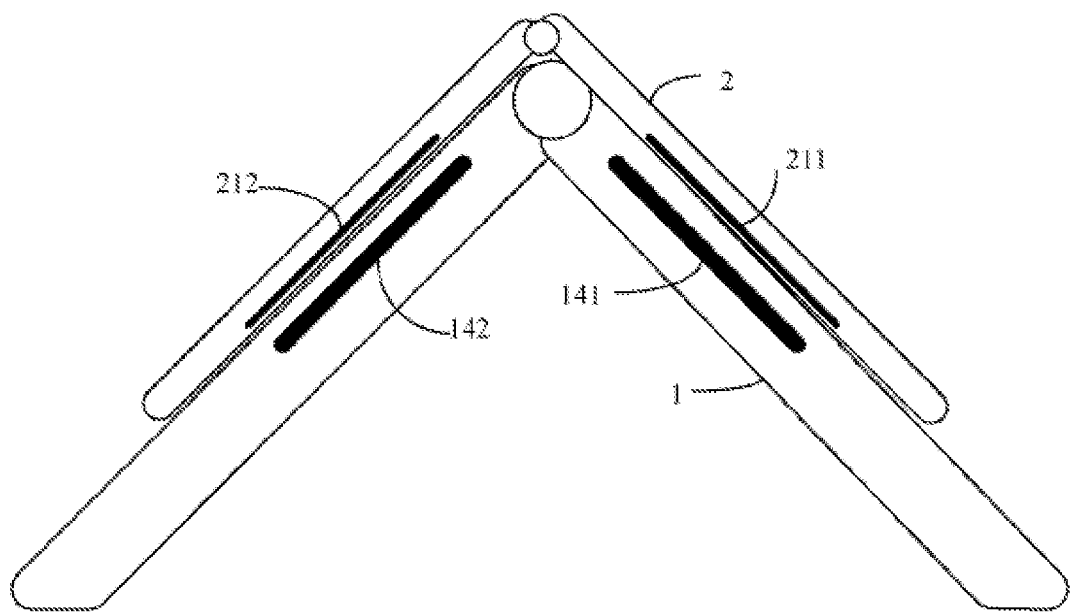

FIG. 7

| When there is a receive coil in both a charging range of a first transmit coil and a charging range of a second transmit coil, control the first transmit coil and the second transmit coil to simultaneously perform charging, or control the first transmit coil and the second transmit coil to alternately perform charging | 801 |

FIG. 8

| When both a first receive coil and a second receive coil are in a charging range of a transmit coil, control the first receive coil and the second receive coil to be simultaneously charged, or control the first receive coil and the second receive coil to be alternately charged | 901 |

FIG. 9

WIRELESS CHARGING TRANSMITTING CIRCUIT, WIRELESS CHARGING RECEIVING CIRCUIT, AND METHOD

CROSS REFERENCE TO RELATED APPLICATIONS

This application is a continuation application of International Application No. PCT/CN2019/094479 filed on Jul. 3, 2019, which claims priority to Chinese Patent Application No. 201810739006.9 filed in China on Jul. 6, 2018, both disclosures of which are incorporated herein by reference in their entireties.

TECHNICAL FIELD

The present disclosure relates to the field of communications technologies, and in particular, to a wireless charging transmitting circuit, a wireless charging receiving circuit, and a method.

BACKGROUND

With continuous popularization of mobile terminals such as a smartphone, a tablet computer, and a camera, a requirement for a battery life of the mobile terminal increases day by day. Through wireless charging, the mobile terminal can be charged without a need to connect the mobile terminal to a wireless charger by using a charging cable, thereby improving convenience and water resistance of the mobile terminal in a charging process. However, although wireless charging is widely applied to the mobile terminal, a wireless charging speed is relatively slow due to a heating problem in a wireless charging process.

In a related technology, for a problem of a relatively large temperature rise in the wireless charging process, no effective solution is proposed.

SUMMARY

According to a first aspect, an embodiment of the present disclosure provides a wireless charging transmitting circuit. The wireless charging transmitting circuit includes:
a power input interface;
a voltage regulator circuit, where one end is connected to the power input interface, and the other end is separately connected to a first input end of a first inverter circuit and a first input end of a second inverter circuit;
a first transmit coil, connected to an output end of the first inverter circuit;
a second transmit coil, connected to an output end of the second inverter circuit; and
a charging control circuit, separately connected to a second input end of the first inverter circuit and a second input end of the second inverter circuit, and configured to: when there is a receive coil in each of a charging range of the first transmit coil and a charging range of the second transmit coil, control the first transmit coil and the second transmit coil to simultaneously perform charging, or control the first transmit coil and the second transmit coil to alternately perform charging.

According to a second aspect, an embodiment of the present disclosure further provides a wireless charging receiving circuit. The wireless charging receiving circuit includes:
a first receive coil;
a second receive coil;
a charging receiving circuit, where a first end is connected to the first receive coil, a second end is connected to the second receive coil, and the charging receiving circuit is configured to perform rectification and voltage conversion on an alternating current signal output by the first receive coil and/or the second receive coil;
a charging management circuit, where one end is connected to a third end of the charging receiving circuit, and the other end is connected to a battery; and
a charging controller, connected to a fourth end of the charging receiving circuit, and configured to: when both the first receive coil and the second receive coil are in a charging range of a transmit coil, control the first receive coil and the second receive coil to be simultaneously charged, or control the first receive coil and the second receive coil to be alternately charged.

According to a third aspect, an embodiment of the present disclosure further provides a wireless charging method. The method is applied to the wireless charging transmitting circuit provided in the first aspect, and the method includes:
when there is a receive coil in each of a charging range of the first transmit coil and a charging range of the second transmit coil, controlling the first transmit coil and the second transmit coil to simultaneously perform charging, or controlling the first transmit coil and the second transmit coil to alternately perform charging.

According to a fourth aspect, an embodiment of the present disclosure further provides a wireless charging method. The method is applied to the wireless charging receiving circuit provided in the second aspect, and the method includes:
when both the first receive coil and the second receive coil are in a charging range of the transmit coil, controlling the first receive coil and the second receive coil to be simultaneously charged, or controlling the first receive coil and the second receive coil to be alternately charged.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

FIG. 7 is a schematic diagram of a placement manner of a charging base and a mobile terminal according to an embodiment of the present disclosure;

FIG. 8 is a flowchart of a wireless charging method according to an embodiment of the present disclosure;

FIG. 9 is a flowchart of a wireless charging method according to another embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of this disclosure without creative efforts shall fall within the protection scope of this disclosure.

Figure 1:
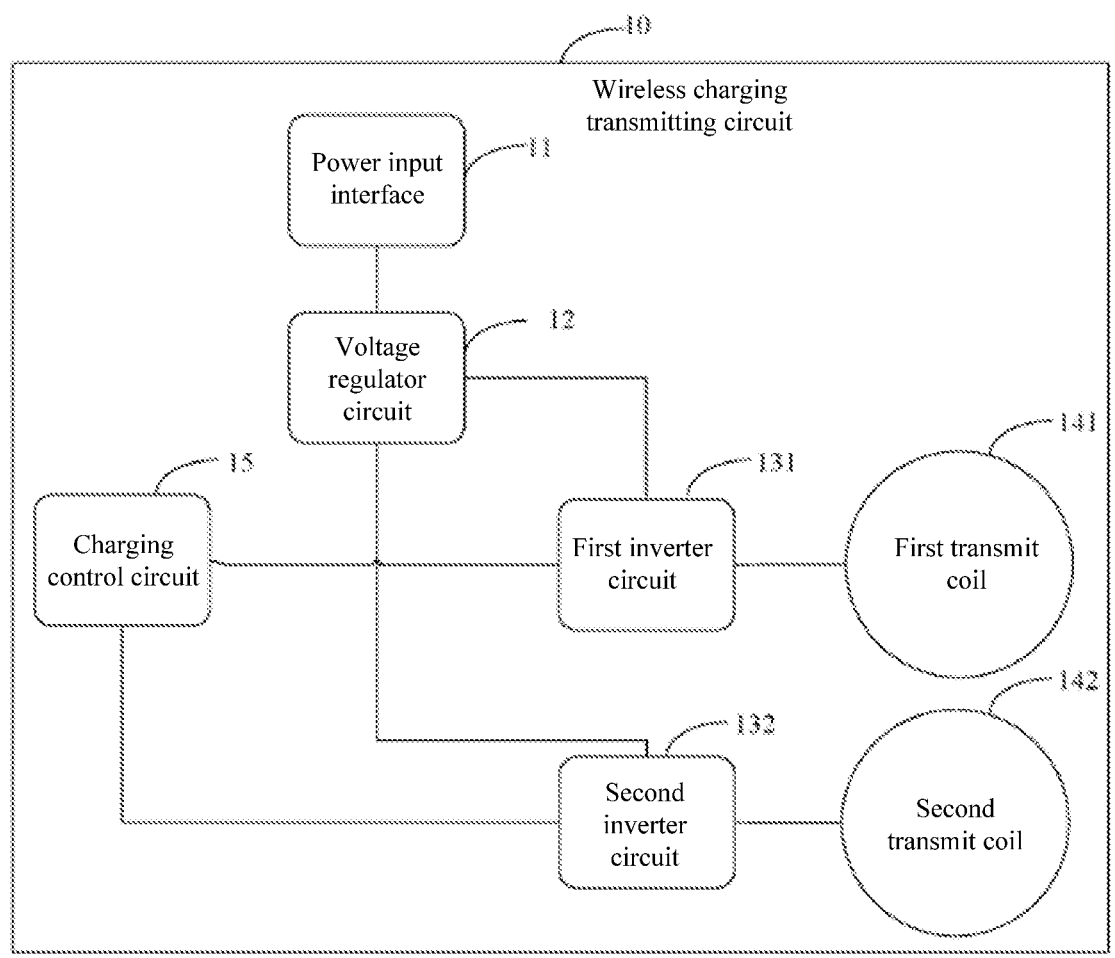
FIG. 1 is a diagram of a circuit structure of a wireless charging transmitting circuit according to an embodiment of the present disclosure.

An embodiment of the present disclosure provides a wireless charging transmitting circuit. FIG. 1 is a diagram of a circuit structure of a wireless charging transmitting circuit according to an embodiment of the present disclosure. As shown in FIG. 1, a wireless charging transmitting circuit 10 includes a power input interface 11, a voltage regulator circuit 12, a first inverter circuit 131, a second inverter circuit 132, a first transmit coil 141, a second transmit coil 142, and a charging control circuit 15.

One end of the power input interface 11 may be configured to connect to a charging adapter, where the charging adapter may be configured to convert a household low-frequency high-voltage alternating current into a high-frequency low-voltage direct current, and the other end of the power input interface 11 is connected to the voltage regulator circuit 12, to perform voltage regulation processing on a power signal (such as a current signal or a voltage signal) input by the power input interface 11.

One end of the voltage regulator circuit 12 is connected to the power input interface 11, and the other end is separately connected to a first input end of the first inverter circuit 131 and a first input end of the second inverter circuit 132, so that a power signal obtained after voltage regulation processing may be separately output to the first inverter circuit 131 and the second inverter circuit 132.

It may be understood that the voltage regulator circuit 12 may include one or more voltage regulator circuits. For example, the power input interface may be separately connected to the first inverter circuit and the second inverter circuit by using a same voltage regulator circuit, or the power input interface may be separately connected to the first inverter circuit and the second inverter circuit by using different voltage regulator circuits (for example, the power input interface is connected to the first inverter circuit by using the first voltage regulator circuit, and is connected to the second inverter circuit by using the second voltage regulator circuit).

The first inverter circuit 131 and the second inverter circuit 132 may separately perform inversion processing on the power signal, to convert the foregoing power information into an alternating current signal, and separately output the alternating current signal to the first transmit coil 141 and the second transmit coil 142.

Optionally, both the first inverter circuit 131 and the second inverter circuit 132 may include a drive module and an inverter module, and the drive module is configured to output a drive signal to drive the inverter module to work.

The first transmit coil 141 is connected to an output end of the first inverter circuit 131, and may transmit an alternating current signal input by the first inverter circuit 131 to a receive coil in a charging range of the first transmit coil 141.

The second transmit coil 142 is connected to an output end of the second inverter circuit 132, and may transmit an alternating current signal input by the second inverter circuit 132 to a receive coil in a charging range of the second transmit coil 142.

The charging control circuit 15 is separately connected to a second input end of the first inverter circuit 131 and a second input end of the second inverter circuit 132, and is configured to: when there is a receive coil in each of the charging range of the first transmit coil 141 and the charging range of the second transmit coil 142, control the first transmit coil 141 and the second transmit coil 142 to simultaneously perform charging, or control the first transmit coil 141 and the second transmit coil 142 to alternately perform charging.

In this implementation, the charging control circuit 15 may be a microcontroller, a single-chip microcomputer, a programmable logic device, or the like. Specifically, the charging control circuit 15 may further control working states (charging or stopping charging) of the first transmit coil 141 and the second transmit coil 142 by separately controlling drive signals of the first inverter circuit 131 and the second inverter circuit 132.

For example, when the first transmit coil 141 needs to be controlled to perform charging, the charging control circuit 15 may output a control signal to the drive module of the first inverter circuit 131, so that the drive module of the first inverter circuit 131 drives the inverter module of the first inverter circuit 131 to work; when the second transmit coil 142 needs to be controlled to perform charging, the charging control circuit 15 may output a control signal to the drive module of the second inverter circuit 132, so that the drive module of the second inverter circuit 132 drives the inverter module of the second inverter circuit 132 to work; when the first transmit coil 141 and the second transmit coil 142 need to be controlled to simultaneously perform charging, the charging control circuit 15 may separately output a control signal to the drive module of the first inverter circuit 131 and the drive module of the second inverter circuit 132, so that both the inverter module of the first inverter circuit 131 and the inverter module of the second inverter circuit 132 work.

In this implementation, that there is a receive coil in each of the charging range of the first transmit coil 141 and the charging range of the second transmit coil 142 may mean that there is a first receive coil in the charging range of the first transmit coil 141, and there is a second receive coil in the charging range of the second transmit coil 142, where the first receive coil and the second receive coil are different receive coils.

Specifically, the charging range of the transmit coil may be a range in which a charging signal sent by the transmit coil can be received. For example, when a distance between the receive coil and the transmit coil is within a range of 1 cm, the receive coil can receive the charging signal transmitted by the transmit coil. Therefore, the charging range may be a range of 1 cm from the transmit coil.

Optionally, in this embodiment of the present disclosure, whether the receive coil is in the charging range of the transmit coil may be determined by detecting a position of the receive coil, or whether the transmit coil is in the charging range of the transmit coil may be determined by detecting whether a communication connection is established between the transmit coil and the receive coil. For example, after a power signal is input to the power input interface, the first transmit coil and the second transmit coil may separately send a polling signal (for example, a ping message) to the outside. If the first transmit coil receives a matching signal (for example, a charging configuration message) returned by the receive coil, it indicates that a communication connection is established between the first transmit coil and the receive coil, in other words, there is a receive coil in the charging range of the first transmit coil. If the second transmit coil receives a matching signal (for example, a charging configuration message) returned by the receive coil, it indicates that a communication connection is established between the second transmit coil and the receive coil, in other words, there is a receive coil in the charging range of the second transmit coil.

In an implementation, when there is a receive coil in each of the charging range of the first transmit coil 141 and the charging range of the second transmit coil 142, the charging control circuit 15 may control the first transmit coil 141 and the second transmit coil 142 to simultaneously perform charging. It may be understood that charging power required by a battery is usually constant. Therefore, compared with charging by using one transmit coil in a related technology, when charging is performed simultaneously by using two transmit coils, transmit power of each transmit coil can be reduced, so that a temperature rise in a wireless charging process can be reduced.

In another implementation, when there is a receive coil in each of the charging range of the first transmit coil 141 and the charging range of the second transmit coil 142, the charging control circuit 15 may also control the first transmit coil 141 and the second transmit coil 142 to alternately perform charging.

For example, the first transmit coil 141 may be first controlled to perform charging. When charging duration of the first transmit coil 141 reaches preset duration, the second transmit coil 142 is controlled to perform charging, and the first transmit coil 141 is controlled to stop performing charging; when charging duration of the second transmit coil 142 reaches the preset duration, the first transmit coil 141 is controlled to perform charging, and the second transmit coil 142 is controlled to stop performing charging; and so on, until the battery is fully charged. Alternatively, the first transmit coil 141 may be first controlled to perform charging. When temperature of the receive coil corresponding to the first transmit coil 141 reaches a preset value, the second transmit coil 142 is controlled to perform charging, and the first transmit coil 141 is controlled to stop performing charging; when temperature of the receive coil corresponding to the second transmit coil 142 reaches a preset value, the first transmit coil 141 is controlled to perform charging, and the second transmit coil 142 is controlled to stop performing charging; and so on, until the battery is fully charged.

In the wireless charging circuit provided in this embodiment of the present disclosure, when there is a receive coil in each of the charging range of the first transmit coil and the charging range of the second transmit coil, the first transmit coil and the second transmit coil are controlled to simultaneously perform charging, or the first transmit coil and the second transmit coil are controlled to alternately perform charging, so that a temperature rise in a wireless charging process can be reduced, and wireless charging efficiency can be improved.

Optionally, the charging control circuit 15 is specifically configured to:

when there is a receive coil in each of the charging range of the first transmit coil and the charging range of the second transmit coil, control the first transmit coil to perform charging; and when temperature of the receive coil corresponding to the first transmit coil reaches a preset value, control the second transmit coil to perform charging, and control the first transmit coil to stop performing charging.

In this embodiment of the present disclosure, when there is a receive coil in each of the charging range of the first transmit coil and the charging range of the second transmit coil, the charging control circuit may first control the first transmit coil to perform charging; and when the temperature of the receive coil corresponding to the first transmit coil reaches the preset value, control the second transmit coil to perform charging, and control the first transmit coil to stop performing charging. It may be understood that, in a process of performing charging by using the second transmit coil, if the temperature of the receive coil corresponding to the second transmit coil reaches the preset value, the first transmit coil is controlled to perform charging, and the second transmit coil is controlled to stop performing charging, and so on, until charging is completed.

For example, in a process of performing charging by using the first transmit coil, if the charging control circuit receives a signal that is sent by the wireless charging receiving circuit and that is used to indicate that the temperature of the receive coil corresponding to the first transmit coil reaches the preset value, the second transmit coil may be controlled to perform charging, and the first transmit coil is controlled to stop performing charging. In a process of performing charging by using the second transmit coil, if a signal that is sent by the wireless charging receiving circuit and that is used to indicate that the temperature of the receive coil corresponding to the second transmit coil reaches the preset value is received, the first transmit coil may be controlled to perform charging, and the second transmit coil is controlled to stop performing charging, and so on, until charging is completed. Therefore, a temperature rise can be reduced.

In this embodiment of the present disclosure, temperature of a receive coil corresponding to a transmit coil that is currently performing charging is monitored, and the transmit coils are alternately controlled to perform charging, thereby reducing a temperature rise in the wireless charging process and improving wireless charging efficiency.

Optionally, the charging control circuit 15 is specifically configured to:

when there is a receive coil in each of the charging range of the first transmit coil and the charging range of the second transmit coil, control the first transmit coil to perform charging by using first transmit power and the second transmit coil to perform charging by using second transmit power, where a sum of the first transmit power and the second transmit power is charging power required by the battery.

In this implementation, the first transmit power and the second transmit power may be the same. For example, both the first transmit power and the second transmit power are half the charging power required by the battery. The first transmit power and the second transmit power may alternatively be different. For example, the first transmit power is 0.4*P, and the second transmit power is 0.6*P; or the first transmit power is 0.7*P, and the second transmit power is 0.3*P; where P is the charging power required by the battery. It may be understood that the charging control circuit may determine the transmit power of the first transmit coil and the transmit power of the second transmit coil based on a power configuration parameter sent by the wireless charging receiving circuit.

In this embodiment of the present disclosure, when there is a receive coil in each of the charging range of the first transmit coil and the charging range of the second transmit coil, the charging control circuit controls the first transmit coil to perform charging by using the first transmit power and the second transmit coil to perform charging by using the second transmit power, and the sum of the first transmit power and the second transmit power is the charging power required by the battery, thereby ensuring charging efficiency and reducing a charging loss while a temperature rise is reduced.

Optionally, the charging control circuit 15 is further configured to:
when there is a receive coil only in the charging range of the first transmit coil, control the first transmit coil to perform charging, or when there is a receive coil only in the charging range of the second transmit coil, control the second transmit coil to perform charging.

In this embodiment of the present disclosure, if there is a receive coil in a charging range of only one transmit coil, charging may be performed by using a transmit coil whose charging range has a receive coil, so that it can be ensured that the wireless charging receiving circuit provided in this embodiment of the present disclosure is compatible with another wireless charging receiving circuit that has only one receive coil, and an applicable range of the wireless charging receiving circuit provided in this embodiment of the present disclosure can be improved.

Figure 2:
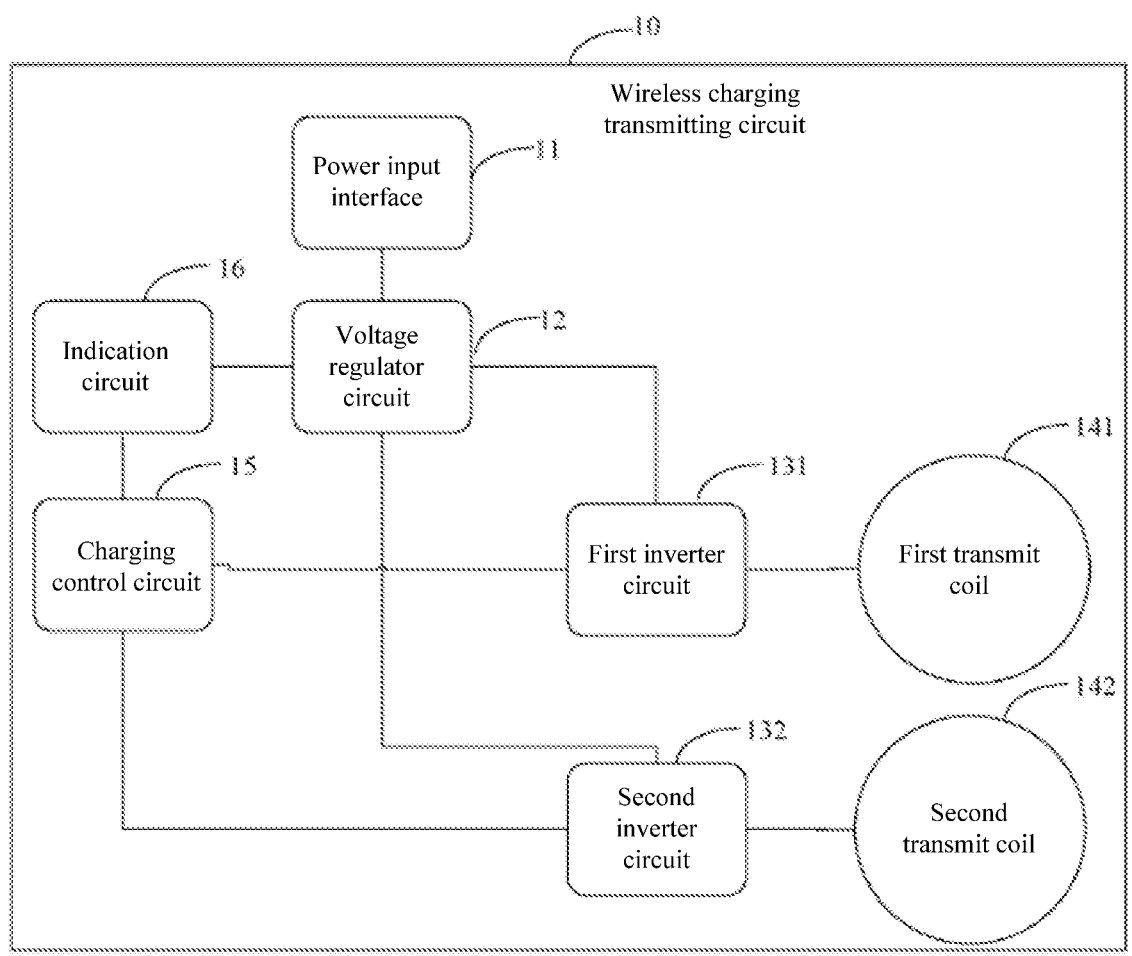
FIG. 2 is a diagram of a circuit structure of a wireless charging transmitting circuit according to another embodiment of the present disclosure.

Optionally, as shown in FIG. 2, the wireless charging transmitting circuit 10 further includes an indication circuit 16, and the indication circuit 16 is connected to the charging control circuit 15 and is configured to indicate a charging state.

In this embodiment of the present disclosure, the indication circuit 16 may be a display screen, and may indicate the charging state, for example, one or more of a charging mode (for example, a dual-coil simultaneous charging mode or a dual-coil cyclic charging mode), whether charging is completed, a current charging parameter (for example, charging power or a charging current), and the like. The indication circuit indicates the charging state, so that a user can know a current charging state.

Figure 3:
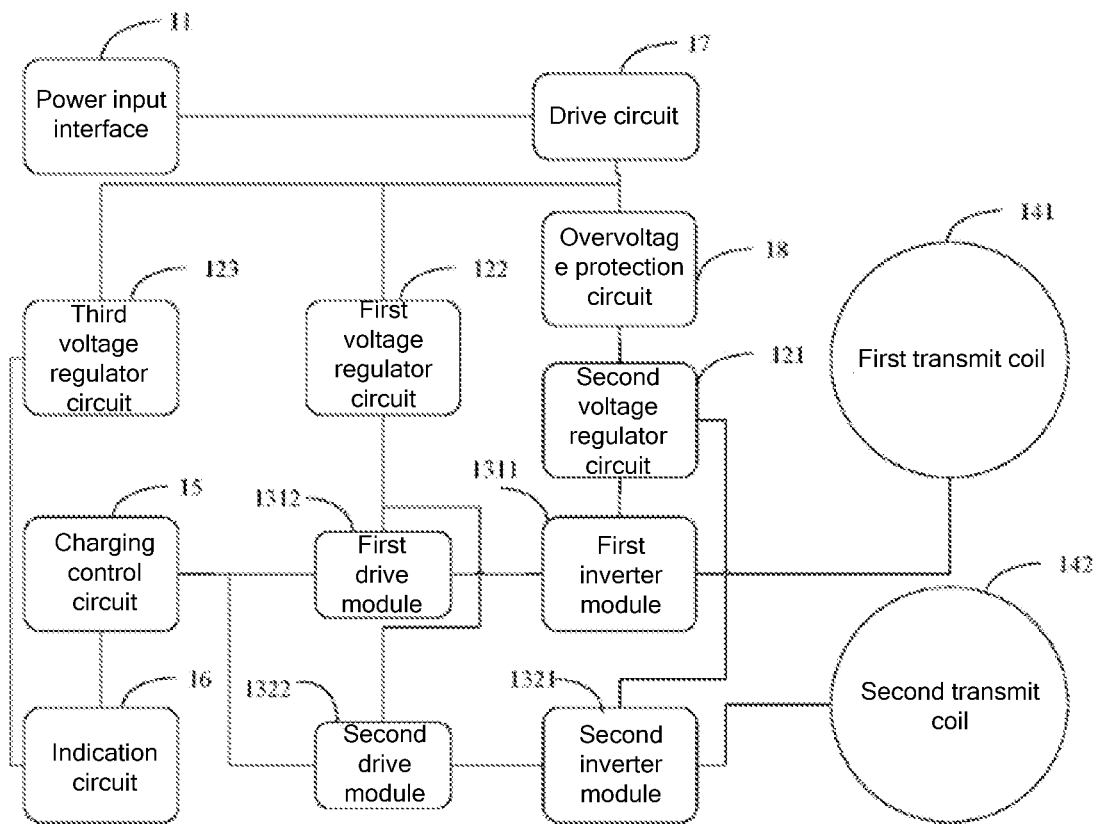
FIG. 3 is a diagram of a circuit structure of a wireless charging transmitting circuit according to still another embodiment of the present disclosure.

It may be understood that other circuit modules such as an overvoltage protection circuit and a filtering circuit may be further set for the wireless charging transmitting circuit according to an actual requirement. For example, as shown in FIG. 3, an output end of the power input interface 11 is separately connected to an input end of an overvoltage protection circuit 18, an input end of a first voltage regulator circuit 122, and an input end of a third voltage regulator circuit 123 by using a drive circuit 17, an output end of the overvoltage protection circuit 18 is separately connected to an input end of the first inverter module 1311 and an input end of the second inverter module 1321 by using a second voltage regulator circuit, an output end of the first voltage regulator circuit 122 is separately connected to an input end of a first drive module 1312 and an input end of a second drive module 1322, an output end of the third regulator circuit is connected to the indication circuit 16, the charging control circuit 15 is separately connected to a control end of the first drive module 1312 and a control end of the second drive module 1322, an output end of the first inverter module 1311 is connected to the first transmit coil 141, and an output end of the second inverter module 1321 is connected to the second transmit coil 142.

Figure 4:
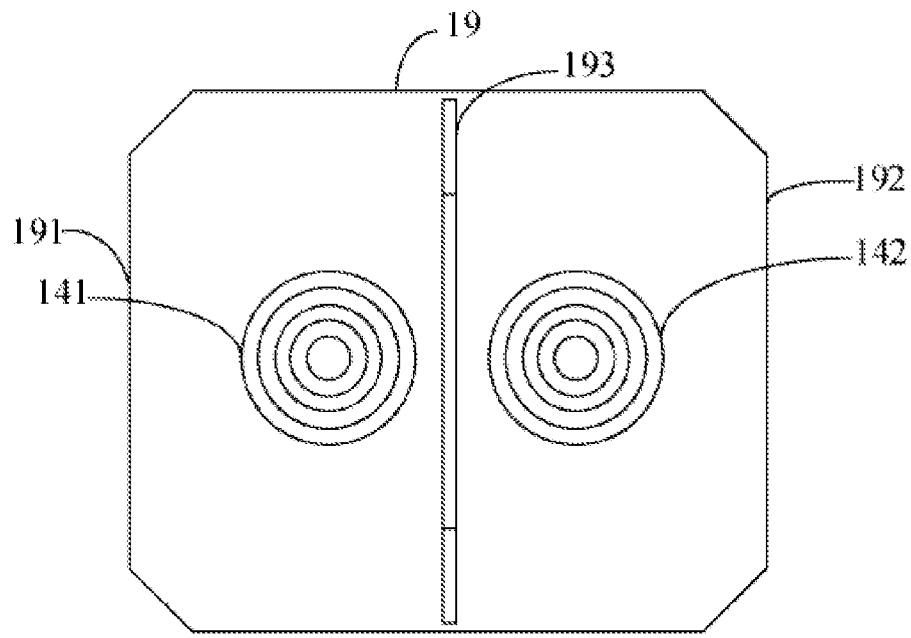
FIG. 4 is a schematic diagram of a collapsible base according to an embodiment of the present disclosure.

Optionally, as shown in FIG. 4, the wireless charging transmitting circuit 10 is applied to a charging base, the charging base includes a collapsible base 19, the collapsible base 19 includes a first base 191 and a second base 192, the first transmit coil 141 is disposed in the first base 191, and the second transmit coil 142 is disposed in the second base 192.

In this embodiment of the present disclosure, the wireless charging transmitting circuit 10 may be disposed in the charging base, the first transmit coil 141 is disposed in the first base 191, the second transmit coil 142 is disposed in the second base 192, and the first base 191 and the second base 192 may be folded along a collapsible region 193.

It may be understood that sizes of the first base and the second base may be the same or different. A position of the first transmit coil on the first base and a position of the second transmit coil on the second base may be symmetric along the collapsible region, or may be asymmetric. Specifically, the positions of the foregoing two transmit coils may be correspondingly set based on the positions of the two receive coils of the wireless charging receiving circuit.

Optionally, the position of the first transmit coil on the first base and the position of the second transmit coil on the second base are symmetric along the collapsible region of the collapsible base.

In this embodiment of the present disclosure, the position of the first transmit coil on the first base and the position of the second transmit coil on the second base are symmetric along the collapsible region of the collapsible base, so that it is convenient for the user to align the transmit coil and the receive coil.

Figure 5:
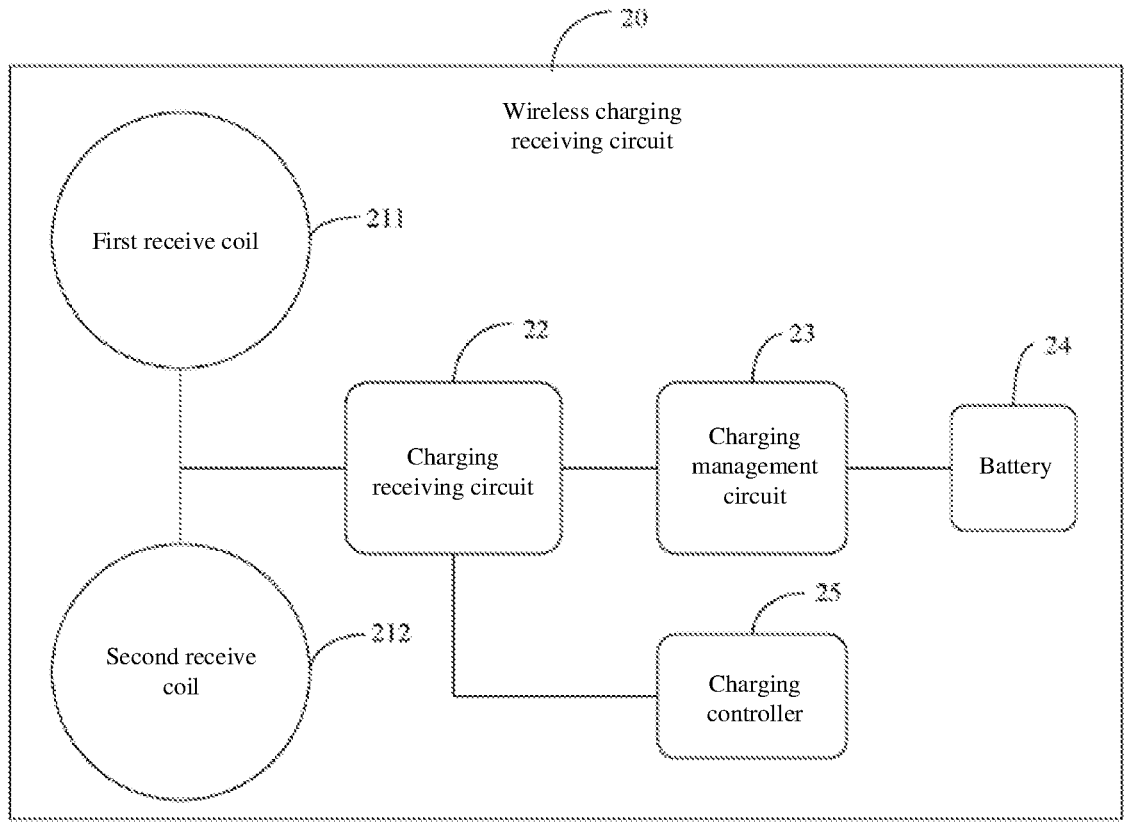
FIG. 5 is a diagram of a circuit structure of a wireless charging receiving circuit according to an embodiment of the present disclosure.

An embodiment of the present disclosure further provides a wireless charging receiving circuit. FIG. 5 is a diagram of a circuit structure of a wireless charging receiving circuit according to an embodiment of the present disclosure. As shown in FIG. 5, a wireless charging receiving circuit 20 includes a first receive coil 211, a second receive coil 212, a charging receiving circuit 22, a charging management circuit 23, a battery 24, and a charging controller 25.

A first end of the charging receiving circuit 22 is connected to the first receive coil 211, a second end is connected to the second receive coil 212, and the charging receiving circuit 22 is configured to perform rectification and voltage conversion on an alternating current signal output by the first receive coil 211 and/or the second receive coil 212.

The charging receiving circuit may include a rectifier module, a voltage conversion module, and the like, so that processing such as rectification and voltage conversion may be performed on the alternating current signal output by the first receive coil and/or the second receive coil, to output a direct current signal to the charging management circuit 23. It may be understood that the charging receiving circuit may further include other circuit modules such as a filtering circuit and a voltage regulator circuit according to an actual requirement. The charging receiving circuit 22 may include one or more charging receiving circuits.

One end of the charging management circuit 23 is connected to a third end of the charging receiving circuit 22, and the other end is connected to the battery 24.

The charging management circuit 23 may control charging parameters such as a charging current and charging power of the battery 24. Specifically, the charging management circuit 23 receives a power signal output by the charging receiving circuit, and may output the power signal to the battery based on a charging current size, a charging power size, and the like required by the battery, to charge the battery.

The charging controller 25 is connected to a fourth end of the charging receiving circuit 22, and is configured to: when both the first receive coil and the second receive coil are in a charging range of a transmit coil, control the first receive coil and the second receive coil to be simultaneously charged, or control the first receive coil and the second receive coil to be alternately charged.

In this embodiment of the present disclosure, the charging controller 25 may be an additionally disposed controller, or may be an existing controller such as a processor on a charging device (for example, a mobile terminal).

In this embodiment of the present disclosure, the charging range of the transmit coil may be a range in which a charging signal sent by the transmit coil can be received. For example, when a distance between the receive coil and the transmit coil is within a range of 1 cm, the receive coil may receive the charging signal transmitted by the transmit coil. Therefore, the charging range may be a range of 1 cm from the transmit coil.

Optionally, in this embodiment of the present disclosure, whether the receive coil is in the charging range of the transmit coil may be determined by detecting a position of the receive coil, or whether the receive coil is in the charging range of the transmit coil may be determined by detecting whether a communication connection is established between the transmit coil and the receive coil.

In an implementation, when both the first receive coil and the second receive coil are in the charging range of the transmit coil, the charging controller may control the first receive coil and the second receive coil to be simultaneously charged.

In this implementation, the charging controller may send a control signal to the wireless charging transmitting circuit, to control the transmit coil corresponding to the first receive coil and the transmit coil corresponding to the second receive coil in the wireless charging transmitting circuit to simultaneously perform charging, so that the first receive coil and the second receive coil are simultaneously charged.

In another implementation, when both the first receive coil and the second receive coil are in the charging range of the transmit coil, the charging controller may control the first receive coil and the second receive coil to be alternately charged.

In this implementation, the charging controller may send a control signal to the wireless charging transmitting circuit, to control the transmit coil corresponding to the first receive coil and the transmit coil corresponding to the second receive coil in the wireless charging transmitting circuit to alternately perform charging, so that the first receive coil and the second receive coil are alternately charged.

For example, the first receive coil may be first controlled to be charged. When charging duration of the first receive coil reaches preset duration, the second receive coil is controlled to be charged, and the first receive coil is controlled to stop being charged; when charging duration of the second receive coil reaches the preset duration, the first receive coil is controlled to be charged, and the second receive coil is controlled to stop being charged; and so on, until the battery is fully charged. Alternatively, the first receive coil may be first controlled to be charged. When temperature of the first receive coil reaches a preset value, the second receive coil is controlled to be charged, and the first receive coil is controlled to stop being charged; and when temperature of the second receive coil reaches the preset value, the first receive coil is controlled to be charged, and the second receive coil is controlled to stop being charged; and so on, until the battery is fully charged.

It may be understood that, in this embodiment of the present disclosure, a switch may be disposed between the first receive coil and the charging receiving circuit, and a switch may be disposed between the second receive coil and the charging receiving circuit, so that the charging controller may control to charge or stop charging the first receive coil by controlling closing or disconnection of the switch corresponding to the first receive coil, and control to charge or stop charging the first receive coil by controlling closing or disconnection of the switch corresponding to the second receive coil.

In the wireless charging receiving circuit provided in this embodiment of the present disclosure, when both the first receive coil and the second receive coil are in the charging range of the transmit coil, the charging controller controls the first receive coil and the second receive coil to be simultaneously charged, or control the first receive coil and the second receive coil to be alternately charged, so that a temperature rise and a charging loss in a wireless charging process can be reduced, and wireless charging efficiency can be improved.

Optionally, the charging controller 25 is specifically configured to:

when both the first receive coil and the second receive coil are in the charging range of the transmit coil, control the first receive coil to be charged; and when temperature of the first receive coil reaches a preset value, control the second receive coil to be charged, and control the first receive coil to stop being charged.

In this embodiment of the present disclosure, the preset value may be properly set according to an actual requirement.

In this implementation, when both the first receive coil and the second receive coil are in the charging range of the transmit coil, the charging controller may first control the first receive coil to be charged; and when the temperature of the first receive coil reaches the preset value, the charging controller may control the second receive coil to be charged, and control the first receive coil to stop being charged. It may be understood that, in a process of performing charging by using the second receive coil, if the temperature of the second receive coil reaches the preset value, the first receive coil is controlled to be charged, and the second receive coil is controlled to stop being charged, and so on, until charging is completed.

In this embodiment of the present disclosure, temperature of a receive coil that is currently being charged is monitored, and receive coils are alternately controlled to be charged, thereby reducing a temperature rise in a wireless charging process and improving wireless charging efficiency.

Optionally, the charging controller 25 is specifically configured to:

when both the first receive coil and the second receive coil are in the charging range of the transmit coil, control the first receive coil to be charged by using first receive power and the second receive coil to be charged by using second receive power, where a sum of the first receive power and the second receive power is charging power required by the battery.

In this implementation, the first receive power and the second receive power may be the same. For example, both the first receive power and the second receive power are half the charging power required by the battery. The first receive power and the second receive power may alternatively be different. For example, the first receive power is 0.4*P, and the second receive power is 0.6*P; or the first receive power is 0.7*P, and the second receive power is 0.3*P; where P is the charging power required by the battery.

It may be understood that receive power of the first receive coil corresponds to transmit power of the transmit coil corresponding to the first receive coil, and receive power of the second receive coil corresponds to transmit power of the transmit coil corresponding to the second receive coil.

In this embodiment of the present disclosure, when both the first receive coil and the second receive coil are in the charging range of the transmit coil, the charging controller controls the first receive coil to be charged by using the first receive power and the second receive coil to be charged by using the second receive power, and the sum of the first receive power and the second receive power is the charging power required by the battery, thereby ensuring charging efficiency and reducing a charging loss while a temperature rise is reduced.

Figure 6:
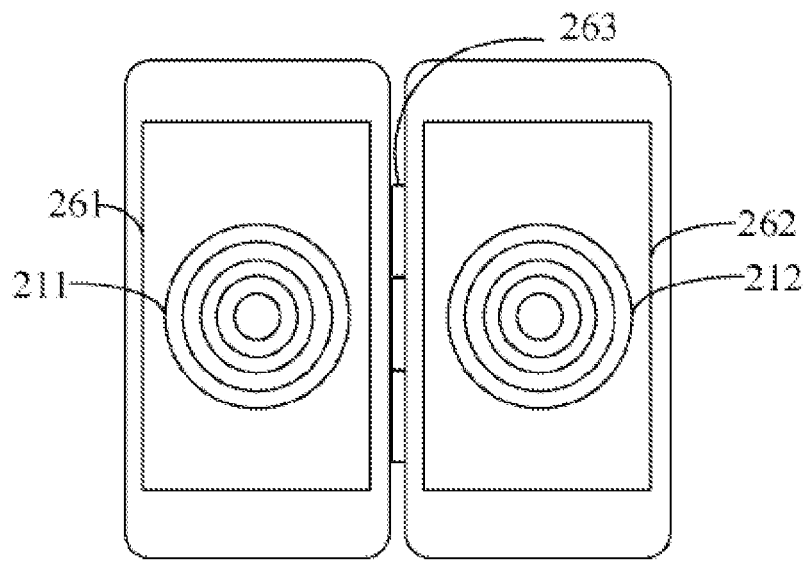
FIG. 6 is a schematic diagram of a collapsible screen according to an embodiment of the present disclosure.

Optionally, as shown in FIG. 6, the wireless charging receiving circuit is applied to a mobile terminal, the mobile terminal includes a collapsible screen, the collapsible screen includes a first screen 261 and a second screen 262, the first receive coil 211 is disposed on a back side of the first screen 261, and the second receive coil 212 is disposed on a back side of the second screen 262.

In this embodiment of the present disclosure, the mobile terminal may be a mobile phone, a tablet personal computer (Tablet Personal Computer), a laptop computer (Laptop Computer), a personal digital assistant (personal digital assistant, PDA), a mobile Internet device (Mobile Internet Device, MID), a wearable device (Wearable Device), or the like.

The first screen and the second screen may be two hinged screens, and the first screen and the second screen may be folded along a collapsible region 263, as shown in FIG. 7. The first screen and the second screen may be alternatively two screens that are obtained by bending a same screen.

The first receive coil is disposed on the back side of the first screen, and the second receive coil is disposed on the back side of the second screen. A position of the first receive coil on the back side of the first screen and a position of the second receive coil on the back side of the second screen may be symmetric along the collapsible region, or may be asymmetric.

Optionally, the position of the first receive coil on the back side of the first screen and the position of the second receive coil on the back side of the second screen are symmetric along the collapsible region of the collapsible screen.

In this embodiment of the present disclosure, the position of the first receive coil on the back side of the first screen and the position of the second receive coil on the back side of the second screen are symmetric along the collapsible region, so that it is convenient for the user to align the transmit coil and the receive coil.

In actual application, because a position of a transmit coil in a charging base with a collapsible base corresponds to a position of the receive coil in the mobile terminal with the collapsible screen, only the collapsible region of the mobile terminal needs to be aligned with the collapsible region in the charging base, so that the transmit coil in the charging base and the receive coil in the mobile terminal can be aligned, and the user can more easily and accurately align charging positions.

In addition, the mobile terminal with the collapsible screen may also be bent into any angle in cooperation with the charging base with the collapsible base for charging. As shown in FIG. 7, after a charging base 1 is bent into a shape with a specific angle, the user may bend a mobile terminal 2 in a same manner, so that transmit coils (namely, the first transmit coil 141 and the second transmit coil 142) in the charging base 1 are aligned with receive coils (namely, the first receive coil 211 and the second receive coil 212) in the mobile terminal 2.

FIG. 8 is a flowchart of a wireless charging method according to an embodiment of the present disclosure. The method is applied to the wireless charging transmitting circuit provided in any one of the foregoing embodiments. As shown in FIG. 8, the wireless charging method includes the following steps.

Step 801: When there is a receive coil in each of a charging range of a first transmit coil and a charging range of a second transmit coil, control the first transmit coil and the second transmit coil to simultaneously perform charging, or control the first transmit coil and the second transmit coil to alternately perform charging.

In this embodiment of the present disclosure, for the wireless charging transmitting circuit, refer to the foregoing descriptions. Details are not described herein.

In this step, the charging range of the transmit coil may be a range in which a charging signal sent by the transmit coil can be received. For example, when a distance between the receive coil and the transmit coil is within a range of 1 cm, the receive coil can receive the charging signal transmitted by the transmit coil. The charging range may be a range of 1 cm from the transmit coil.

In this step, that there is a receive coil in each of the charging range of the first transmit coil and the charging range of the second transmit coil may mean that there is a first receive coil in the charging range of the first transmit coil, and there is a second receive coil in the charging range of the second transmit coil, where the first receive coil and the second receive coil are different receive coils.

Optionally, in this embodiment of the present disclosure, whether the receive coil is in the charging range of the transmit coil may be determined by detecting a position of the receive coil, or whether the receive coil is in the charging range of the transmit coil may be determined by detecting whether a communication connection is established between the transmit coil and the receive coil. For example, after a power signal is input to a power input interface, the first transmit coil and the second transmit coil may separately send a polling signal (for example, a ping message) to the outside. If the first transmit coil receives a matching signal (for example, a charging configuration message) returned by the receive coil, it indicates that a communication connection is established between the first transmit coil and the receive coil, in other words, there is a receive coil in the charging range of the first transmit coil. If the second transmit coil receives a matching signal (for example, a charging configuration message) returned by the receive coil, it indicates that a communication connection is established between the second transmit coil and the receive coil, in other words, there is a receive coil in the charging range of the second transmit coil.

In an implementation, when there is a receive coil in each of the charging range of the first transmit coil and the charging range of the second transmit coil, the first transmit coil and the second transmit coil may be controlled to simultaneously perform charging. It may be understood that charging power required by a battery is usually constant. Therefore, compared with charging by using one transmit coil in a related technology, when charging is performed simultaneously by using two transmit coils, transmit power of each transmit coil can be reduced, so that a temperature rise in a wireless charging process can be reduced.

In another implementation, when there is a receive coil in each of the charging range of the first transmit coil and the charging range of the second transmit coil, the first transmit coil and the second transmit coil may be alternatively controlled to alternately perform charging.

For example, the first transmit coil may be first controlled to perform charging. When charging duration of the first transmit coil reaches preset duration, the second transmit coil is controlled to perform charging, and the first transmit coil is controlled to stop performing charging; when charging duration of the second transmit coil reaches the preset duration, the first transmit coil is controlled to perform charging, and the second transmit coil is controlled to stop performing charging; and so on, until the battery is fully charged. Alternatively, the first transmit coil may be first controlled to perform charging. When temperature of the receive coil corresponding to the first transmit coil reaches a preset value, the second transmit coil is controlled to perform charging, and the first transmit coil is controlled to stop performing charging; and when temperature of the receive coil corresponding to the second transmit coil reaches the preset value, the first transmit coil is controlled to perform charging, and the second transmit coil is controlled to stop performing charging; and so on, until the battery is fully charged.

In the wireless charging method provided in this embodiment of the present disclosure, when there is a receive coil in each of the charging range of the first transmit coil and the charging range of the second transmit coil, the first transmit coil and the second transmit coil are controlled to simultaneously perform charging, or the first transmit coil and the second transmit coil are controlled to alternately perform charging, so that a temperature rise and a charging loss in a wireless charging process can be reduced, and wireless charging efficiency can be improved.

Optionally, step 801, to be specific, controlling the first transmit coil and the second transmit coil to alternately perform charging when there is a receive coil in each of the charging range of the first transmit coil and the charging range of the second transmit coil, may include:

when there is a receive coil in each of the charging range of the first transmit coil and the charging range of the second transmit coil, controlling the first transmit coil to perform charging; and when temperature of the receive coil corresponding to the first transmit coil reaches a preset value, controlling the second transmit coil to perform charging, and controlling the first transmit coil to stop performing charging.

In this embodiment of the present disclosure, when there is a receive coil in each of the charging range of the first transmit coil and the charging range of the second transmit coil, the first transmit coil may be first controlled to perform charging; and when the temperature of the receive coil corresponding to the first transmit coil reaches the preset value, the second transmit coil is controlled to perform charging, and the first transmit coil is controlled to stop performing charging. It may be understood that, in a process of performing charging by using the second transmit coil, if the temperature of the receive coil corresponding to the second transmit coil reaches the preset value, the first transmit coil is controlled to perform charging, and the second transmit coil is controlled to stop performing charging, and so on, until charging is completed.

For example, in a process of performing charging by using the first transmit coil, if a signal that is sent by a wireless charging receiving circuit and that is used to indicate that the temperature of the receive coil corresponding to the first transmit coil reaches the preset value is received, the second transmit coil may be controlled to perform charging, and the first transmit coil is controlled to stop performing charging. In a process of performing charging by using the second transmit coil, if a signal that is sent by the wireless charging receiving circuit and that is used to indicate that the temperature of the receive coil corresponding to the second transmit coil reaches the preset value is received, the first transmit coil may be controlled to perform charging, and the second transmit coil is controlled to stop performing charging, and so on, until charging is completed. Therefore, a temperature rise can be reduced.

In this embodiment of the present disclosure, temperature of a receive coil corresponding to a transmit coil that is currently performing charging is monitored, and the transmit coils are alternately controlled to perform charging, thereby reducing a temperature rise in the wireless charging process and improving wireless charging efficiency.

Optionally, step 801, to be specific, controlling the first transmit coil and the second transmit coil to simultaneously perform charging when there is a receive coil in each of the charging range of the first transmit coil and the charging range of the second transmit coil, includes:

when there is a receive coil in each of the charging range of the first transmit coil and the charging range of the second transmit coil, controlling the first transmit coil to perform charging by using first transmit power and the second transmit coil to perform charging by using second transmit power, where a sum of the first transmit power and the second transmit power is charging power required by the battery.

In this implementation, the first transmit power and the second transmit power may be the same. For example, both the first transmit power and the second transmit power are half the charging power required by the battery. The first transmit power and the second transmit power may alternatively be different. For example, the first transmit power is 0.4*P, and the second transmit power is 0.6*P; or the first transmit power is 0.7*P, and the second transmit power is 0.3*P; where P is the charging power required by the battery. It may be understood that the charging control circuit may determine the transmit power of the first transmit coil and the transmit power of the second transmit coil based on a power configuration parameter sent by the wireless charging receiving circuit.

In this embodiment of the present disclosure, when there is a receive coil in each of the charging range of the first transmit coil and the charging range of the second transmit coil, the first transmit coil is controlled to perform charging by using the first transmit power and the second transmit coil is controlled to perform charging by using the second transmit power, and the sum of the first transmit power and the second transmit power is the charging power required by the battery, thereby ensuring charging efficiency and reducing a charging loss while a temperature rise is reduced.

Optionally, the method further includes:
when there is a receive coil only in the charging range of the first transmit coil, controlling the first transmit coil to perform charging; and
when there is a receive coil only in the charging range of the second transmit coil, controlling the second transmit coil to perform charging.

In this embodiment of the present disclosure, if there is a receive coil in a charging range of only one transmit coil, charging may be performed by using a transmit coil whose charging range has a receive coil, so that it can be ensured that the wireless charging receiving circuit provided in this embodiment of the present disclosure is compatible with another wireless charging receiving circuit that has only one receive coil, and an applicable range of the wireless charging receiving circuit provided in this embodiment of the present disclosure can be improved.

FIG. 9 is a flowchart of a wireless charging method according to another embodiment of the present disclosure. The method is applied to the wireless charging receiving circuit provided in any one of the foregoing embodiments. As shown in FIG. 9, the wireless charging method includes the following steps.

Step 901: When both a first receive coil and a second receive coil are in a charging range of a transmit coil, control the first receive coil and the second receive coil to be simultaneously charged, or control the first receive coil and the second receive coil to be alternately charged.

In an implementation, when both the first receive coil and the second receive coil are in the charging range of the transmit coil, the first receive coil and the second receive coil may be controlled to be simultaneously charged.

In this implementation, a control signal may be sent to the wireless charging transmitting circuit, to control the transmit coil corresponding to the first receive coil and the transmit coil corresponding to the second receive coil in the wireless charging transmitting circuit to simultaneously perform charging, so that the first receive coil and the second receive coil are simultaneously charged.

In another implementation, when both the first receive coil and the second receive coil are in the charging range of the transmit coil, the first receive coil and the second receive coil may be controlled to be alternately charged.

In this implementation, a control signal may be sent to the wireless charging transmitting circuit, to control the transmit coil corresponding to the first receive coil and the transmit coil corresponding to the second receive coil in the wireless charging transmitting circuit to alternately perform charging, so that the first receive coil and the second receive coil are alternately charged.

For example, the first receive coil may be first controlled to be charged. When charging duration of the first receive coil reaches preset duration, the second receive coil is controlled to be charged, and the first receive coil is controlled to stop being charged; when charging duration of the second receive coil reaches the preset duration, the first receive coil is controlled to be charged, and the second receive coil is controlled to stop being charged; and so on, until the battery is fully charged. Alternatively, the first receive coil may be first controlled to perform charging. When temperature of the first receive coil reaches a preset value, the second receive coil is controlled to be charged, and the first receive coil is controlled to stop being charged; and when temperature of the second receive coil reaches the preset value, the first receive coil is controlled to be charged, and the second receive coil is controlled to stop being charged; and so on, until the battery is fully charged.

It may be understood that, in this embodiment of the present disclosure, a switch may be disposed between the first receive coil and the charging receiving circuit, and a switch may be disposed between the second receive coil and the charging receiving circuit, so that the first receive coil is controlled to be charged or stop being charged by controlling closing or disconnection of the switch corresponding to the first receive coil, and the first receive coil is controlled to be charged or stop being charged by controlling closing or disconnection of the switch corresponding to the second receive coil.

In the wireless charging method provided in this embodiment of the present disclosure, when both the first receive coil and the second receive coil are in the charging range of the transmit coil, the first receive coil and the second receive coil are controlled to be simultaneously charged, or the first receive coil and the second receive coil are controlled to be alternately charged, so that a temperature rise and a charging loss in a wireless charging process can be reduced, and wireless charging efficiency can be improved.

Optionally, step 901, to be specific, controlling the first receive coil and the second receive coil to be alternately charged when both the first receive coil and the second receive coil are in the charging range of the transmit coil, includes:
when both the first receive coil and the second receive coil are in the charging range of the transmit coil, controlling the first receive coil to be charged; and
when temperature of the first receive coil reaches a preset value, controlling the second receive coil to be charged, and controlling the first receive coil to stop being charged.

In this embodiment of the present disclosure, the preset value may be properly set according to an actual requirement.

In this implementation, when both the first receive coil and the second receive coil are in the charging range of the transmit coil, the first receive coil may be first controlled to be charged; and when the temperature of the first receive coil reaches the preset value, the second receive coil is controlled to be charged, and the first receive coil is controlled to stop being charged. It may be understood that, in a process of performing charging by using the second receive coil, if the temperature of the second receive coil reaches the preset value, the first receive coil is controlled to be charged, and the second receive coil is controlled to stop being charged, and so on, until charging is completed.

In this embodiment of the present disclosure, temperature of a receive coil that is currently being charged is monitored, and the receive coils are alternately controlled to be charged, thereby reducing a temperature rise in a wireless charging process and improving wireless charging efficiency.

Optionally, controlling the first receive coil and the second receive coil to be simultaneously charged when both the first receive coil and the second receive coil are in the charging range of the transmit coil includes:
when both the first receive coil and the second receive coil are in the charging range of the transmit coil, controlling the first receive coil to be charged by using first receive power and the second receive coil to be charged by using second receive power, where a sum of the first receive power and the second receive power is charging power required by a battery.

In this implementation, the first receive power and the second receive power may be the same. For example, both the first receive power and the second receive power are half the charging power required by the battery. The first receive power and the second receive power may alternatively be different. For example, the first receive power is 0.4*P, and the second receive power is 0.6*P; or the first receive power is 0.7*P, and the second receive power is 0.3*P; where P is the charging power required by the battery.

It may be understood that receive power of the first receive coil corresponds to transmit power of the transmit coil corresponding to the first receive coil, and receive power of the second receive coil corresponds to transmit power of the transmit coil corresponding to the second receive coil.

In this embodiment of the present disclosure, when both the first receive coil and the second receive coil are in the charging range of the transmit coil, the first receive coil is controlled to be charged by using the first receive power and the second receive coil is controlled to be charged by using the second receive power, and the sum of the first receive power and the second receive power is the charging power required by the battery, thereby ensuring charging efficiency and reducing a charging loss while a temperature rise is reduced.

The following describes the embodiments of the present disclosure with reference to examples:

In an implementation, when power is supplied to a power input interface, the first transmit coil and the second transmit coil may simultaneously send a polling signal to the outside, and charging starts when a receive end (namely, the foregoing mobile terminal) matches the signal. A specific charging process may include the following three working states:

In a first working state, when only one receive coil at a receive end is aligned with the first transmit coil, a charging control circuit (namely, a control IC) of the first transmit coil receives a signal corresponding to the receive end, the first transmit coil starts to work, the second transmit coil still maintains a polling state, and the first transmit coil charges the receive end according to a load requirement.

In a second working state, when one receive coil at a receive end is aligned with the second transmit coil, the working state is the same as the foregoing first working state.

In a third working state, when two receive coils of a receive end are aligned with the transmit coil, the first transmit coil and the second transmit coil simultaneously perform charging (referred to as a dual-coil simultaneous charging mode below). In this working state, a controller (such as a micro controller unit (Micro Controller Unit, MCU)) at the receive end controls the first receive coil and the second receive coil to separately receive half power, for example, when the receive end needs power of 12 V 1 A, that is, 12 W, the first receive coil and the second receive coil may each receive 6 W, in other words, each receive coil receives a current of 0.5 A. In this method, a problem of an excessively high temperature rise during wireless charging can be effectively resolved, and a heat loss of this dual-coil charging manner is far less than a heat loss of a single coil.

The following shows a difference between a heat loss in a conventional single-coil wireless charging manner and a heat loss in a dual-coil simultaneous charging mode provided in this embodiment of the present disclosure by calculating a loss of the transmit coil, a loss of the receive coil, and a loss of the charging receiving circuit (namely, a charging receiving IC).

It is assumed that the battery needs charging power of 12 W. In this case, an input end of a charging management circuit (namely, a charging management IC) needs a current of 12 V 1 A. In the conventional single-coil wireless charging manner, in the case of 12 V 1 A, efficiency of the charging receiving circuit (namely, the charging receiving IC), the transmit coil, and the receive coil is approximately 80%. Therefore, a current flowing through the coil is approximately 1.25 A, and power consumed by the transmit coil and the receive coil is approximately 0.8125 W. A receive end in a single-coil solution needs only one charging receiving IC, and efficiency of the charging receiving IC is approximately 85% in the case of 12 V 1 A. Therefore, a loss at the receive end is approximately 0.75 W, and a total loss at the receive end is approximately 1.5625 W. When the dual-coil simultaneous charging mode provided in this embodiment of the present disclosure is used, power of both receive coils is 6 W (12 V 0.5 A). In the case of 12 V 0.5 A, efficiency of the charging receiving IC, the transmit coil, and the receive coil is approximately 78%. Therefore, a current flowing through each coil is approximately 0.641 A, and power consumed by the transmit coil and the receive coil is approximately 0.4273 W. When there are two charging receiving ICs, efficiency of the charging receiving IC is approximately 80% in the case of 12 V 0.5 A, a sum of losses of the two charging receiving ICs is approximately 0.3072 W, and a total loss at the receive end is approximately 0.7345 W.

It may be learned from the foregoing comparison that, a loss in the dual-coil simultaneous charging mode provided in this embodiment of the present disclosure is reduced by half than the single-coil charging mode, and a temperature rise during wireless charging can be effectively reduced.

Figure 10:
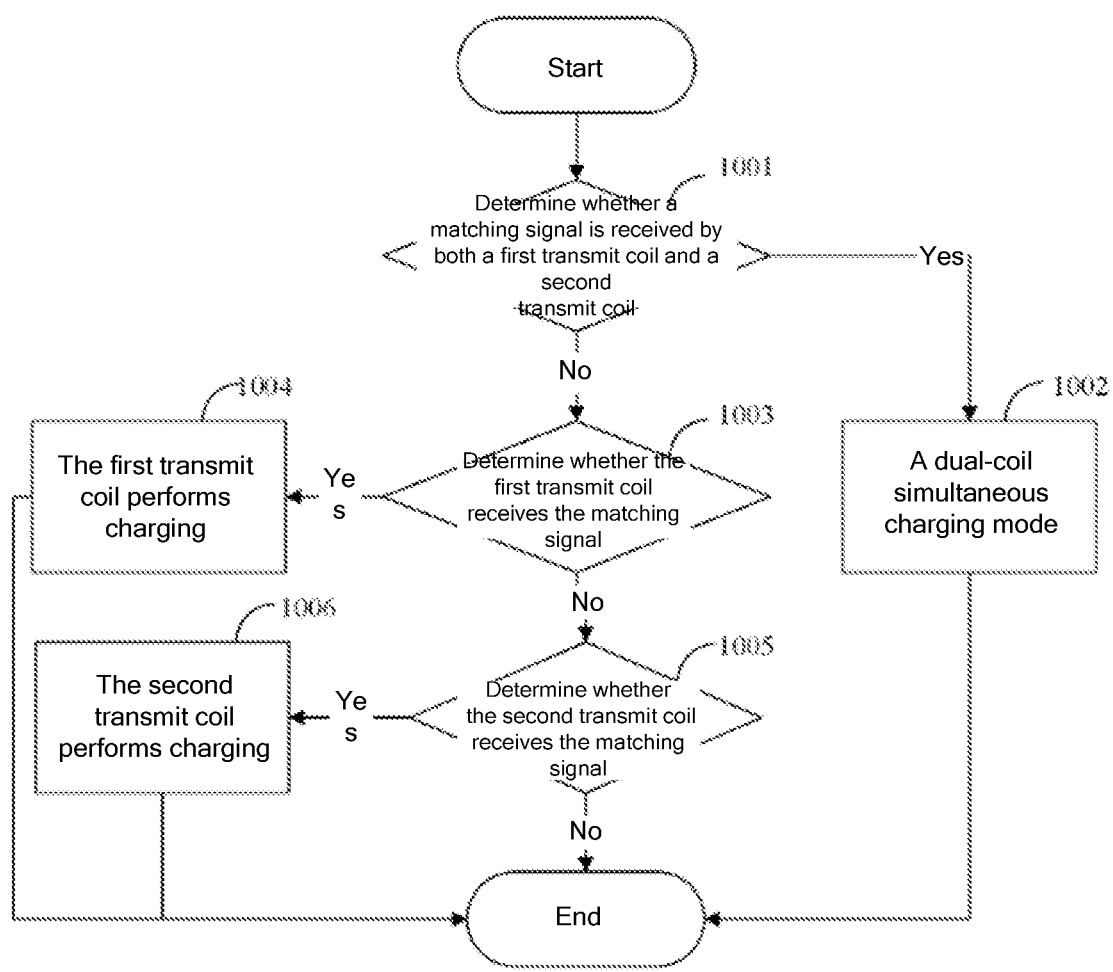
FIG. 10 is a flowchart of a wireless charging method according to still another embodiment of the present disclosure.

Specifically, as shown in FIG. 10, the wireless charging method provided in this embodiment of the present disclosure may include the following steps:

Step 1001: Determine whether a matching signal is received by both a first transmit coil and a second transmit coil.

In this implementation, when both the first transmit coil and the second transmit coil receive the matching signal (in other words, both the first transmit coil and the second transmit coil establish a communication connection to a receive coil), step 1002 is performed; otherwise, step 1003 is performed.

Step 1002: A dual-coil simultaneous charging mode.

In this implementation, the dual-coil simultaneous charging mode is that the first transmit coil and the second transmit coil simultaneously perform charging.

Step 1003: Determine whether the first transmit coil receives the matching signal.

In this implementation, when the first transmit coil receives the matching signal (in other words, the first transmit coil establishes a communication connection to the receive coil), step 1004 is performed; otherwise, step 1005 is performed.

Step 1004: The first transmit coil performs charging.

Step 1005: Determine whether the second transmit coil receives the matching signal.

In this implementation, when the second transmit coil receives the matching signal (in other words, the second transmit coil establishes a communication connection to the receive coil), step 1006 is performed; otherwise, this procedure ends.

Step 1006: The second transmit coil performs charging.

In another implementation, when power is supplied to a power input interface, the first transmit coil and the second transmit coil may simultaneously send a polling signal to the outside, and charging starts when a receive end (namely, the foregoing mobile terminal) matches the signal. A specific charging process may include the following three working states:

In a first working state, when only one receive coil at a receive end is aligned with the first transmit coil, a charging control circuit (namely, a control IC) of the first transmit coil receives a signal corresponding to the receive end, the first transmit coil starts to work, the second transmit coil still maintains a polling state, and the first transmit coil charges the receive end according to a load requirement.

In a second working state, when one receive coil at a receive end is aligned with the second transmit coil, the working state is the same as the foregoing first working state.

In a third working state, when both two receive coils at a receive end are aligned with the transmit coil, the first transmit coil and the second transmit coil work cyclically according to a specific condition (referred to as a dual-coil cyclic charging mode below). After dual-coil cyclic charging starts, the first transmit coil may be first controlled to perform charging. After detecting that a temperature rise of the first receive coil reaches a specified threshold K, the receive end (namely, the foregoing mobile terminal) automatically switches to the second transmit coil for wireless charging, and the first transmit coil stops performing charging. After the receive end detects that temperature of the second receive coil reaches K, the receive end automatically switches to the first transmit coil for wireless charging, and the second transmit coil stops performing charging. In this way, charging is cyclically performed, a charging temperature rise can be effectively reduced without affecting charging duration, and charging efficiency can be appropriately improved.

Figure 11:
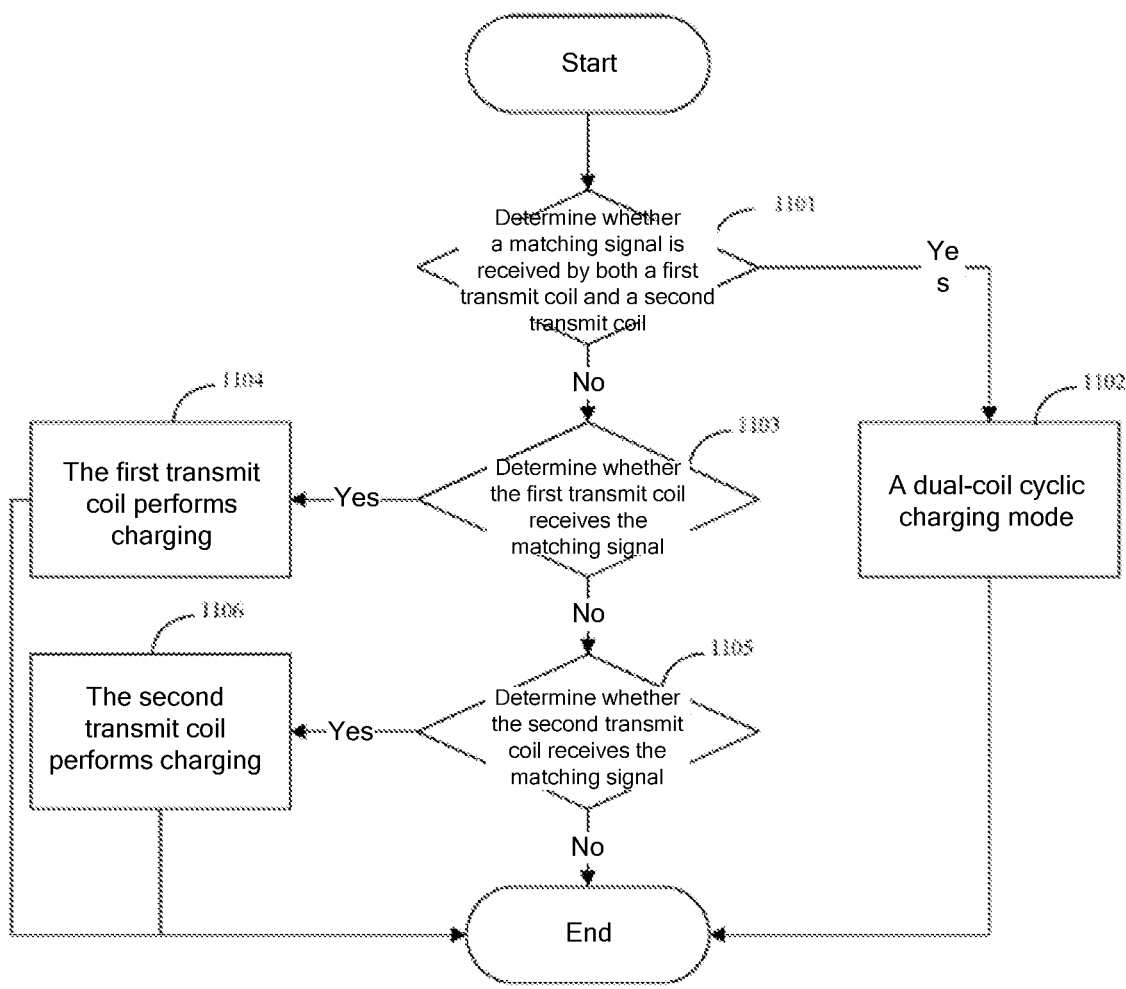
FIG. 11 is a flowchart of a wireless charging method according to yet another embodiment of the present disclosure.

Specifically, as shown in FIG. 11, the wireless charging method provided in this embodiment of the present disclosure may include the following steps:

Step 1101: Determine whether a matching signal is received by both a first transmit coil and a second transmit coil.

In this implementation, when both the first transmit coil and the second transmit coil receive the matching signal (in other words, both the first transmit coil and the second transmit coil establish a communication connection to a receive coil), step 1102 is performed; otherwise, step 1103 is performed.

Step 1102: A dual-coil cyclic charging mode.

In this implementation, the dual-coil simultaneous charging mode is that the first transmit coil and the second transmit coil cyclically perform charging.

Step 1103: Determine whether the first transmit coil receives the matching signal.

In this implementation, when the first transmit coil receives the matching signal (in other words, the first transmit coil establishes a communication connection to the receive coil), step 1104 is performed; otherwise, step 1105 is performed.

Step 1104: The first transmit coil performs charging.

Step 1105: Determine whether the second transmit coil receives the matching signal.

In this implementation, when the second transmit coil receives the matching signal (in other words, the second transmit coil establishes a communication connection to the receive coil), step 1106 is performed; otherwise, this procedure ends.

Step 1106: The second transmit coil performs charging.

According to the dual-coil simultaneous charging mode and the dual-coil cyclic charging mode provided in the embodiments of the present disclosure, because a loss is far less than a single coil manner, charging power can be relatively increased, a wireless charging speed can be improved, and a problem of a slow wireless charging speed in a related technology is resolved.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to related technologies may be implemented in a form of a software product. The computer software product is stored in a storage medium (such as a read-only memory (Read-Only Memory, ROM)/random access memory (Random Access Memory, RAM), a magnetic disk, or an optical disc) and includes several instructions for instructing a terminal (which may be a mobile phone, a computer, a server, an air conditioner, or a network device) to perform the methods described in the embodiments of the present disclosure.

The embodiments of the present disclosure are described with reference to the accompanying drawings. However, the present disclosure is not limited to the foregoing specific implementations. The foregoing specific implementations are merely exemplary, but are not limiting. A person of ordinary skill in the art may make many forms without departing from the objective and the scope of the claims of the present disclosure.

The invention claimed is:

1. A wireless charging transmitting circuit, comprising:
a power input interface;
a voltage regulator circuit, wherein one end of the voltage regulator circuit is connected to the power input interface, and the other end of the voltage regulator circuit is separately connected to a first input end of a first inverter circuit and a first input end of a second inverter circuit;
a first transmit coil, connected to an output end of the first inverter circuit;
a second transmit coil, connected to an output end of the second inverter circuit; and
a charging control circuit, separately connected to a second input end of the first inverter circuit and a second input end of the second inverter circuit, and configured to: when there is a receive coil in each of a charging range of the first transmit coil and a charging range of the second transmit coil, control the first transmit coil and the second transmit coil to alternately perform charging;
wherein the charging control circuit is specifically configured to:
when there is a receive coil in each of the charging range of the first transmit coil and the charging range of the second transmit coil, control the first transmit coil to perform charging; and when temperature of the receive coil corresponding to the first transmit coil reaches a preset value, control the second transmit coil to perform charging, and control the first transmit coil to stop performing charging.

2. The wireless charging transmitting circuit according to claim 1, wherein the charging control circuit is specifically configured to:
when there is a receive coil in each of the charging range of the first transmit coil and the charging range of the second transmit coil, control the first transmit coil to perform charging by using first transmit power and the second transmit coil to perform charging by using second transmit power, wherein a sum of the first transmit power and the second transmit power is charging power required by a battery.

3. The wireless charging transmitting circuit according to claim 1, wherein the charging control circuit is further configured to:
when there is a receive coil only in the charging range of the first transmit coil, control the first transmit coil to perform charging, or when there is a receive coil only in the charging range of the second transmit coil, control the second transmit coil to perform charging.

4. The wireless charging transmitting circuit according to claim 1, further comprising an indication circuit, wherein the indication circuit is connected to the charging control circuit and is configured to indicate a charging state.

5. A wireless charging transmitting circuit, comprising:
a power input interface;
a voltage regulator circuit, wherein one end of the voltage regulator circuit is connected to the power input interface, and the other end of the voltage regulator circuit is separately connected to a first input end of a first inverter circuit and a first input end of a second inverter circuit;
a first transmit coil, connected to an output end of the first inverter circuit;
a second transmit coil, connected to an output end of the second inverter circuit; and
a charging control circuit, separately connected to a second input end of the first inverter circuit and a second input end of the second inverter circuit, and configured to: when there is a receive coil in each of a charging range of the first transmit coil and a charging range of the second transmit coil, control the first transmit coil and the second transmit coil to simultaneously perform charging, or control the first transmit coil and the second transmit coil to alternately perform charging;
wherein the wireless charging transmitting circuit is applied to a charging base, the charging base comprises a collapsible base, the collapsible base comprises a first base and a second base, the first transmit coil is disposed in the first base, and the second transmit coil is disposed in the second base.

6. The wireless charging transmitting circuit according to claim 5, wherein a position of the first transmit coil on the first base and a position of the second transmit coil on the second base are symmetric along a collapsible region of the collapsible base.

7. A wireless charging receiving circuit, comprising:
a first receive coil;
a second receive coil;
a charging receiving circuit, wherein a first end is connected to the first receive coil, a second end is connected to the second receive coil, and the charging receiving circuit is configured to perform rectification and voltage conversion on an alternating current signal output by the first receive coil and/or the second receive coil;
a charging management circuit, wherein one end is connected to a third end of the charging receiving circuit, and the other end is connected to a battery; and
a charging controller, connected to a fourth end of the charging receiving circuit, and configured to: when both the first receive coil and the second receive coil are in a charging range of a transmit coil, control the first receive coil and the second receive coil to be alternately charged;
wherein the charging controller is specifically configured to:
when both the first receive coil and the second receive coil are in the charging range of the transmit coil, control the first receive coil to be charged; and when temperature of the first receive coil reaches a preset value, control the second receive coil to be charged, and control the first receive coil to stop being charged.

8. The wireless charging receiving circuit according to claim 7, wherein the charging controller is specifically configured to:
when both the first receive coil and the second receive coil are in the charging range of the transmit coil, control the first receive coil to be charged by using first receive power and the second receive coil to be charged by using second receive power, wherein a sum of the first receive power and the second receive power is charging power required by the battery.

9. The wireless charging receiving circuit according to claim 7, wherein the wireless charging receiving circuit is applied to a mobile terminal, the mobile terminal comprises a collapsible screen, the collapsible screen comprises a first screen and a second screen, the first receive coil is disposed on a back side of the first screen, and the second receive coil is disposed on a back side of the second screen.

10. The wireless charging receiving circuit according to claim 9, wherein a position of the first receive coil on the back side of the first screen and a position of the second receive coil on the back side of the second screen are symmetric along a collapsible region of the collapsible screen.

11. A wireless charging method, comprising:
providing the wireless charging transmitting circuit according to claim 1,
when there is a receive coil in each of a charging range of the first transmit coil and a charging range of the second transmit coil, controlling the first transmit coil and the second transmit coil to alternately perform charging;
wherein the controlling the first transmit coil and the second transmit coil to alternately perform charging when there is a receive coil in each of the charging range of the first transmit coil and the charging range of the second transmit coil comprises:
when there is a receive coil in each of the charging range of the first transmit coil and the charging range of the second transmit coil, controlling the first transmit coil to perform charging; and
when temperature of the receive coil corresponding to the first transmit coil reaches a preset value, controlling the second transmit coil to perform charging, and controlling the first transmit coil to stop performing charging.

12. A wireless charging method, comprising:
providing the wireless charging receiving circuit according to claim 7;

when both the first receive coil and the second receive coil are in a charging range of the transmit coil, controlling the first receive coil and the second receive coil to be alternately charged;

wherein the controlling the first receive coil and the second receive coil to be alternately charged when both the first receive coil and the second receive coil are in the charging range of the transmit coil comprises:

when both the first receive coil and the second receive coil are in the charging range of the transmit coil, controlling the first receive coil to be charged; and when temperature of the first receive coil reaches a preset value, controlling the second receive coil to be charged, and controlling the first receive coil to stop being charged.

* * * * *